US009362793B2

(12) United States Patent
Iki et al.

(10) Patent No.: US 9,362,793 B2
(45) Date of Patent: Jun. 7, 2016

(54) STATOR FOR ELECTRIC ROTARY MACHINE

(75) Inventors: Tomotaka Iki, Saitama (JP); Takeki Kishi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 13/553,470

(22) Filed: Jul. 19, 2012

(65) Prior Publication Data
US 2013/0020890 A1    Jan. 24, 2013

(30) Foreign Application Priority Data
Jul. 21, 2011    (JP) .................................. 2011-160221

(51) Int. Cl.
*H02K 3/28*    (2006.01)
*H02K 3/12*    (2006.01)
(Continued)

(52) U.S. Cl.
CPC .. *H02K 3/12* (2013.01); *H02K 3/28* (2013.01); *H02K 3/345* (2013.01); *H02K 3/50* (2013.01); *H02K 9/22* (2013.01); *H02K 15/0414* (2013.01); *H02K 15/0025* (2013.01); *H02K 15/0081* (2013.01)

(58) Field of Classification Search
CPC ....... H02K 15/0025; H02K 3/24; H02K 3/34; H02K 3/12; H02K 3/28; H02K 3/345; H02K 3/50; H02K 9/22; H02K 15/0414
USPC ................ 310/DIG. 6, 71, 201, 215
See application file for complete search history.

(56) References Cited

U.S. PATENT DOCUMENTS 4,321,497 A * 3/1982 Long .................... H02K 3/12
                                                    310/198
5,422,526 A * 6/1995 Kawabata ............... H02K 3/12
                                                    310/201
(Continued)

FOREIGN PATENT DOCUMENTS

JP    2000-270506 A    9/2000
JP    2001-275288 A    10/2001
(Continued)

OTHER PUBLICATIONS

Japanese Office Action application No. 2011-160221 dated Jun. 11, 2013.
(Continued)

*Primary Examiner* — Joshua Benitez-Rosario
*Assistant Examiner* — Rashad Johnson
(74) *Attorney, Agent, or Firm* — Squire Patton Boggs (US) LLP

(57) ABSTRACT

A stator for an electric rotary machine includes: a stator core having a plurality of slots; and segmented coils of a plurality of phases (for example, coils 50 in the embodiment), wherein: the segmented coils of a plurality of phases have pluralities of coil bars which are inserted individually in the plurality of slots in the stator core and which extend substantially in a straight line and pluralities of connection coils which connect together the coil bars of the same phase to thereby make up extending portions; the connection coils each comprise an inner connection coil and an outer connection coil which are disposed in different axial positions; and the inner connection coil faces an outer connection coil of a different phase in an axial direction and the outer connection coil faces the inner connection coil of a different phase in the axial direction.

7 Claims, 16 Drawing Sheets

(51) Int. Cl.
*H02K 3/34* (2006.01)
*H02K 9/22* (2006.01)
*H02K 15/04* (2006.01)
*H02K 3/50* (2006.01)
*H02K 15/00* (2006.01)

(56) References Cited

U.S. PATENT DOCUMENTS

| | | | | |
|---|---|---|---|---|
| 5,616,977 A | * | 4/1997 | Hill | H02K 3/12 29/596 |
| 5,773,905 A | * | 6/1998 | Hill | H02K 1/06 310/179 |
| 5,804,902 A | * | 9/1998 | Hill | H02K 3/12 310/116 |
| 5,864,193 A | * | 1/1999 | Katoh | 310/214 |
| 6,664,705 B2 | * | 12/2003 | Dooley | 310/216.106 |
| 6,700,282 B2 | * | 3/2004 | Mori et al. | 310/208 |
| 6,856,063 B1 | * | 2/2005 | Kelecy | H02K 3/04 29/596 |
| 6,870,294 B2 | * | 3/2005 | Holzheu | H02K 3/12 310/201 |
| 6,894,417 B2 | | 5/2005 | Cai et al. | |
| 6,958,561 B2 | * | 10/2005 | Liao | 310/179 |
| 7,402,925 B2 | * | 7/2008 | Best et al. | 310/68 C |
| 8,736,127 B2 | * | 5/2014 | Schlote | H02K 3/12 29/596 |
| 2002/0153799 A1 | * | 10/2002 | Kurahashi et al. | 310/201 |
| 2010/0207481 A1 | * | 8/2010 | Lambert | 310/201 |
| 2011/0285224 A1 | * | 11/2011 | Iki et al. | 310/64 |
| 2014/0319960 A1 | * | 10/2014 | Iki | H02K 3/12 310/216.115 |

FOREIGN PATENT DOCUMENTS

| | | |
|---|---|---|
| JP | 2002-051488 A | 2/2002 |
| JP | 2003-158840 | 5/2003 |
| JP | 2006-158044 A | 6/2006 |
| JP | 2010-161928 A | 7/2010 |
| JP | 2010-193708 A | 9/2010 |
| WO | WO 2010067710 A1 * | 6/2010 |

OTHER PUBLICATIONS

Chinese Office Action application No. 201210251334.7 issued Apr. 3, 2014.

* cited by examiner

STATOR FOR ELECTRIC ROTARY MACHINE

BACKGROUND

1. Field of the Invention

The present invention relates to a stator for an electric rotary machine which is installed in an electric vehicle or a hybrid vehicle.

2. Description of the Related Art

Conventionally, as a stator for an electric rotary machine which is fabricated using segment coils, there have been known stators for electric rotary machines in which coils are formed by inserting plural segments which are made up of electric conductors which are formed into a U-shape in slots in a stator core, thereafter bending leg portions and joining together end portions of the segments (refer to JP-A-2003-158840 and U.S. Pat. No. 6,894,417).

In stators for electric rotary machines described in JP-A-2003-158840 and U.S. Pat. No. 6,894,417, coils are formed through a forming operation of forming electric conductors into a U-shape, a bending operation of bending leg portions and a joining (welding) operation of joining together end portions of the electric conductors. Because of this, the end portions of the electric conductors are joined together in such a state that the end portions project in the axial direction, and therefore, the size of the stator is increased in the axial direction due to extending portions, and the length of the extending portions is increased. Thus, there still exists room for improvement.

SUMMARY

The invention has been made in view of the problems described above, and an object thereof is to provide a stator for an electric rotary machine which can be reduced in size by suppressing the projection of extending portions in the axial direction and which can enhance the performance thereof by suppressing the copper loss as a result of the length of the extending portions being reduced.

With a view to attaining the object, according to a first aspect of the invention, there is provided a stator (for example, a stator 10 in an embodiment which will be described later) for an electric rotary machine including:

a stator core (for example, a stator core 21 in the embodiment) having plural slots (for example, slots 23 in the embodiment); and segmented coils of plural phases (for example, coils 50 in the embodiment), wherein the segmented coils of plural phases have plural coil bars (for example, coil bars 25 in the embodiment) which are inserted individually in the plural slots in the stator core and which extend substantially in a straight line and plural connection coils (for example, connection coils 40 in the embodiment) which connect together the coil bars of the same phase to thereby make up extending portions, wherein the connection coils each include an inner connection coil (for example, an inner connection coil 42 in the embodiment) and an outer connection coil (for example, an outer connection coil 41 in the embodiment) which are disposed in different axial positions, and wherein the inner connection coil faces an outer connection coil of a different phase in an axial direction and the outer connection coil faces the inner connection coil of a different phase in the axial direction.

According to a second aspect of the invention, there is provided a stator core for an electric rotary machine as set forth in the first aspect, wherein a pair of base plates (for example, base plates 31L, 31R in the embodiment) are provided at both ends of the stator core, wherein in each of the pair of base plates, plural grooves (for example, outer surface grooves 37 and inner surface grooves 38 in the embodiment) are formed on each of an outer surface (for example, an outer surface 35 in the embodiment) and an inner surface (for example, an inner surface 36 in the embodiment) thereof which face each other, wherein the outer connection coils are disposed in the grooves (for example, the outer surface grooves 37 in the embodiment) which are formed on the outer surface, and wherein the inner connection coils are disposed in the grooves (for example, the inner surface grooves 38 in the embodiment) which are formed on the inner surface.

According to a third aspect of the invention, there is provided a stator for an electric rotary machine as set forth in the first or second aspect, wherein the coil bars which are inserted individually in the slots each include a radially outer coil bar (for example, a radially outer coil bar 26 in the embodiment) and a radially inner coil bar (for example, a radially inner coil bar 27 in the embodiment) which are aligned in a radial direction, wherein one of the radially outer coil bar and the radially inner coil bar is connected to the outer connection coil at one end and is connected to the inner connection coil at the other end thereof, and wherein the other of the radially outer coil bar and the radially inner coil bar is connected to the inner connection coil at one end and is connected to the outer connection coil at the other end thereof.

According to a fourth aspect of the invention, there is provided a stator for an electric rotary machine as set forth in the third aspect, wherein the outer connection coil connected to the radially outer coil bar at the one end thereof extends radially outwards and in one of a clockwise direction and a counterclockwise direction to thereby be connected to an inner connection coil of the same phase, wherein the inner connection coil connected to the radially outer coil bar at the other end thereof extends radially outwards and in the other of the clockwise direction and the counterclockwise direction to thereby be connected to an outer connection coil of the same phase, wherein the inner connection coil connected to the radially inner coil bar at the one end thereof extends radially outwards and in the other of the clockwise direction and the counterclockwise direction to thereby be connected to an outer connection coil of the same phase, and wherein the outer connection coil connected to the radially inner coil bar at the other end thereof extends radially outwards and in the one of the clockwise direction and the counterclockwise direction to thereby be connected to an inner connection coil of the same phase.

According to a fifth aspect of the invention, there is provided a stator for an electric rotary machine as set forth in the fourth aspect, wherein in each of the base plates, a radially inner through hole (for example, a radially inner through hole 33 in the embodiment) and a radially outer through hole (for example, a radially outer through hole 32 in the embodiment) in which the radially inner coil bar and the radially outer coil bar which are disposed in the same slot in the stator core are inserted, respectively, are formed so as to be aligned in the radial direction, wherein the inner connection coil and the outer connection coil which are connected to the radially outer coil bar are formed so as to extend along an involute curve, and wherein the inner connection coil and the outer connection coil which are connected to the radially inner coil bar are formed so as to extend along an involute curve while being bent at a radially inner end of the involute curve so as to extend radially outwards from the radially inner through hole while extending around the radially outer through hole.

According to a sixth aspect of the invention, there is provided a stator for an electric rotary machine as set forth in any of the third to fifth aspects, wherein the radially outer coil bar and the radially inner coil bar have the same length.

According to a seventh aspect of the invention, there is provided a stator for an electric rotary machine as set forth in any of the first to sixth aspects, wherein the plural connection coils are disposed within a region where the stator core is projected in the axial direction.

According to the first aspect of the invention, the extending portions which connect together the coil bars of the same phase are made up of the inner connection coils and the outer connection coils which are disposed in the different axial positions, whereby the axial projection of the extending portions can be suppressed, thereby making it possible to reduce the size of the stator. In addition, the copper loss is reduced as a result of the reduction in length of the extending portions, whereby the efficiency of the electric rotary machine is enhanced.

According to the second aspect of the invention, the inner connection coils and the outer connection coils are disposed in the different axial positions efficiently in such a state that they are isolated from each other by the base plate, whereby not only can the size of the stator be reduced, but also the assembling properties of the segmented coils can be enhanced.

According to the third aspect of the invention, the outer and inner connection coils can be connected to the two coil bars which extend from the slot in the form of a wave winding.

According to the fourth aspect of the invention, the outer and inner connection coils can be connected to the coil bars which extend from the slots radially outwards, whereby the rotor can easily be disposed inside the stator, thereby making it possible to connect the connection coils with the coil bars in the form of a wave winding.

According to the fifth aspect of the invention, the inner connection coils and the outer connection coils do not interfere with each other within the base plate, thereby making it possible to reduce the area occupied by them.

According to the sixth aspect of the invention, the radially outer coil bar and the radially inner coil bar are made to have the same length, so that coil bar parts can be commonized.

According to the seventh aspect of the invention, the radial size of the stator can be reduced, and the rotor can easily be disposed inside the stator.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
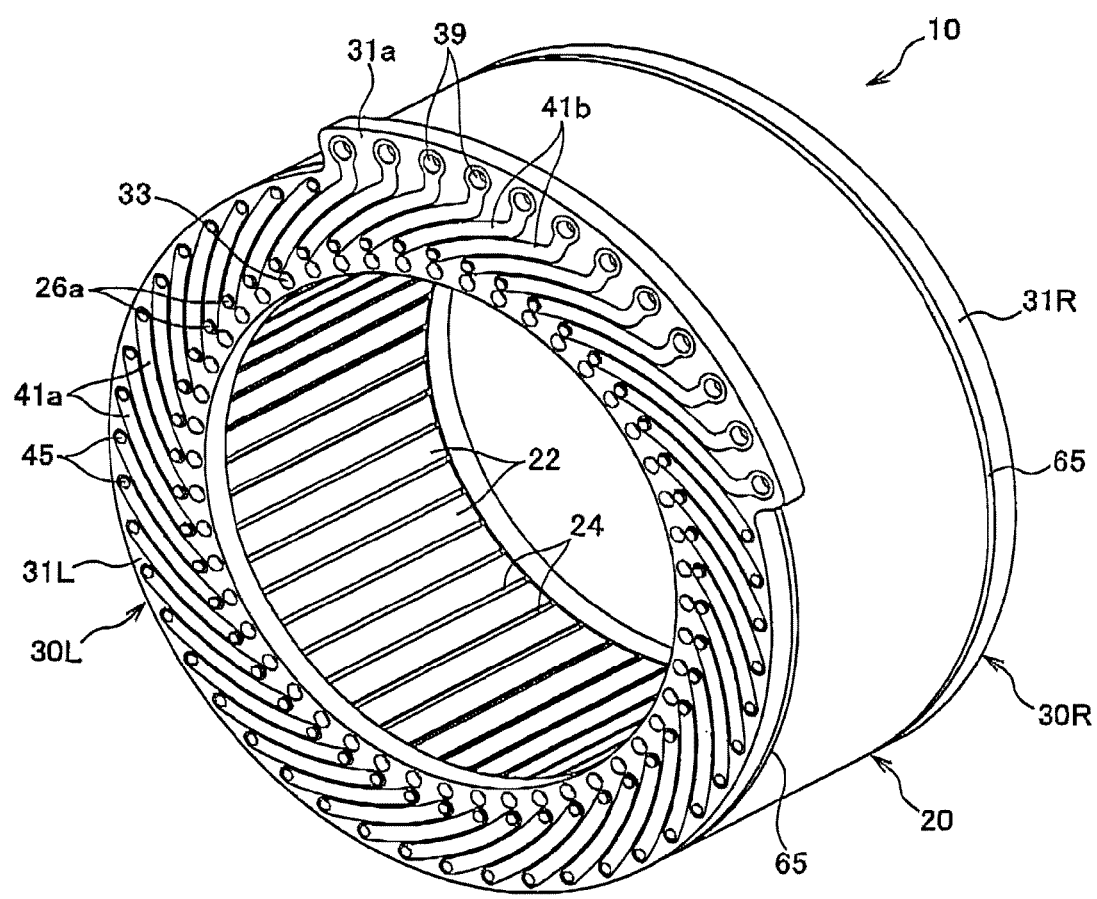
FIG. 1 is a perspective view of a stator for an electric rotary machine according to the invention.

Hereinafter, an embodiment of the invention will be described by reference to the accompanying drawings. The drawings are to be seen in an orientation in which reference numerals given look properly.

Figure 2:
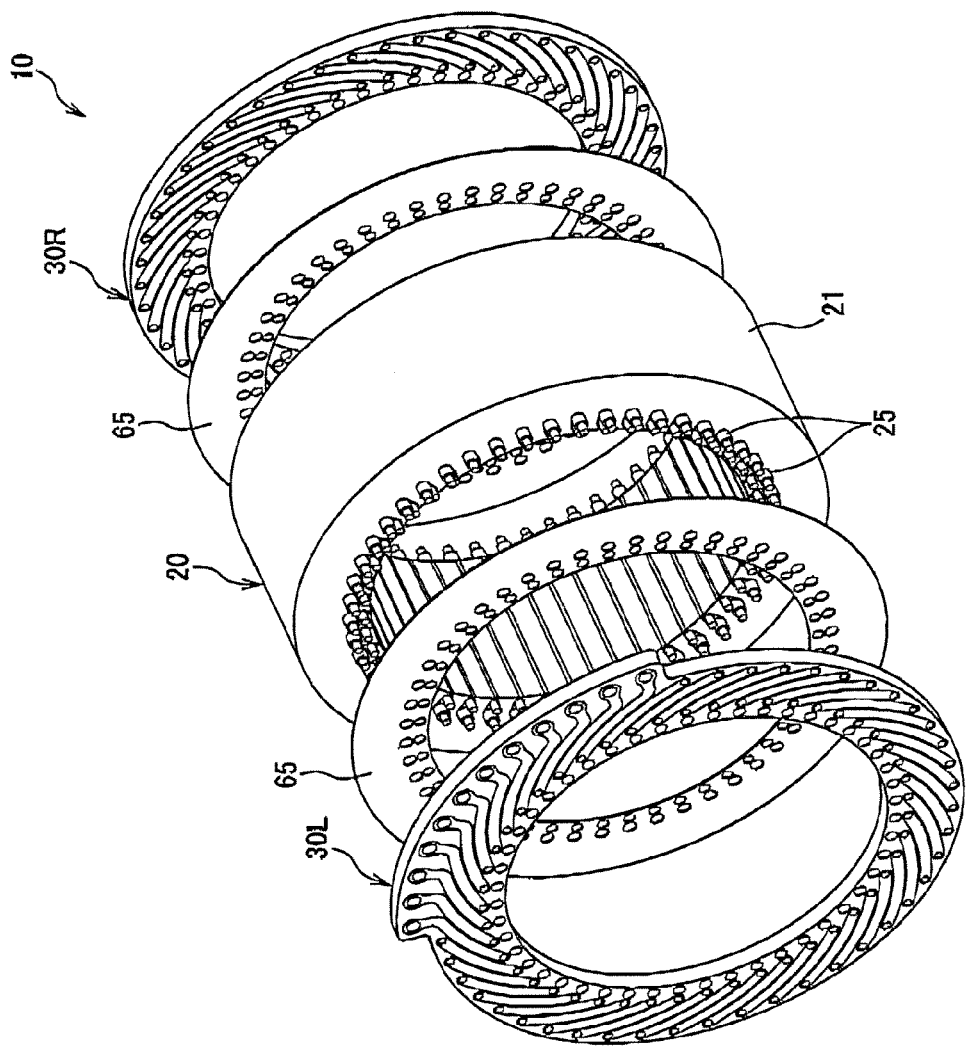
FIG. 2 is an exploded perspective view of the stator shown in FIG. 1.
Figure 3A:
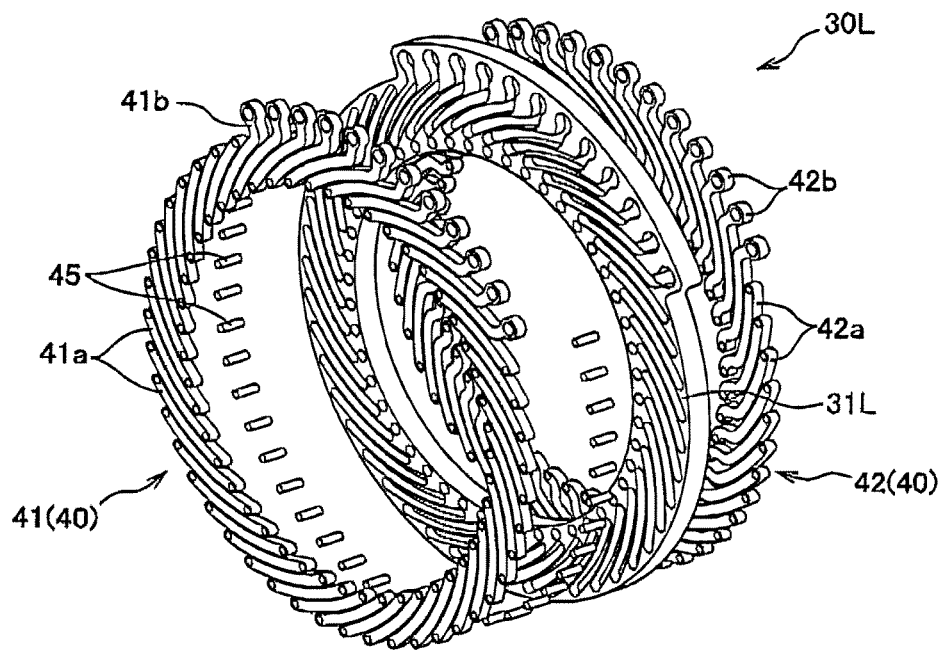
FIG. 3A is an exploded perspective view of one of base plate assemblies shown in FIG. 2.
Figure 3B:
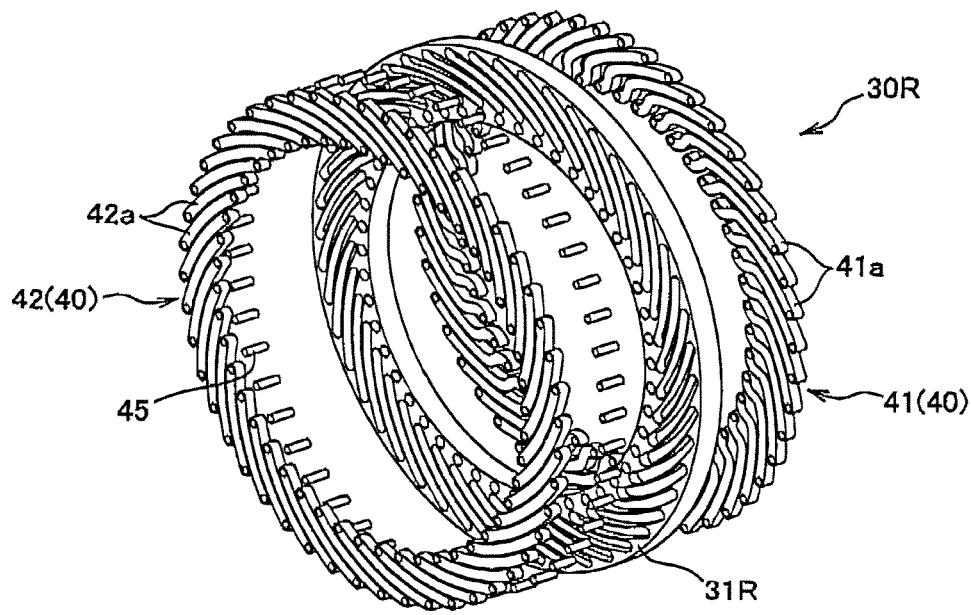
FIG. 3B is an exploded perspective view of the other base plate assembly.
Figure 5:
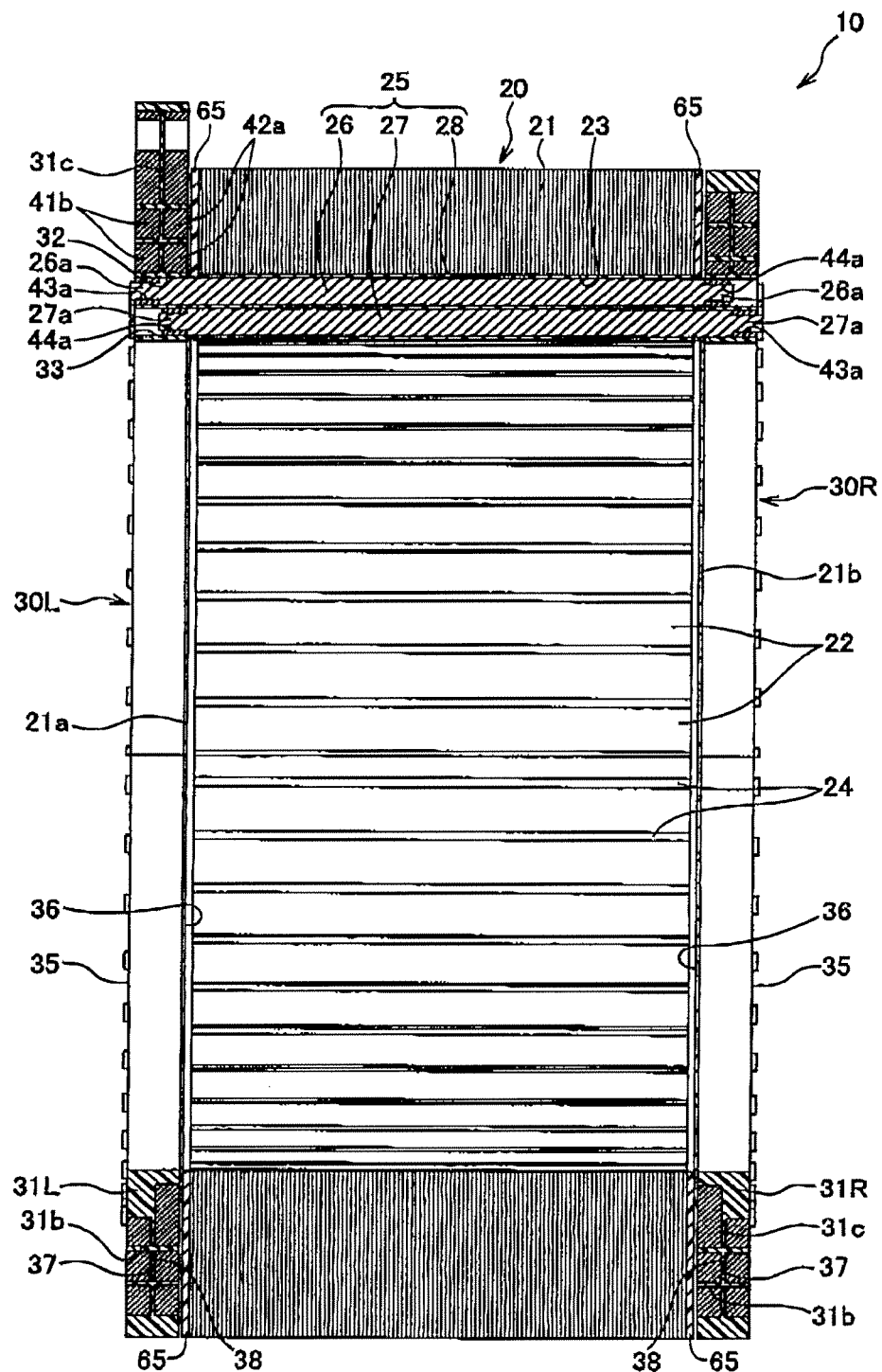
FIG. 5 is a vertical sectional view of the stator shown in FIG. 1 which is taken along the line A-A in FIG. 6.

As shown in FIGS. 1, 2 and 5, a stator 10 for an electric rotary machine according to this embodiment includes a stator core assembly 20 and a pair of base plate assemblies 30L, 30R, and the base plate assemblies 30L, 30R are disposed and assembled individually to ends of the stator core assembly 20. An insulation sheet 65 which is made of, for example, silicone is disposed between the stator core assembly 20 and each of the base plate assemblies 30L, 30R to insulate the stator core assembly 20 and the base plate assemblies.

The stator core assembly 20 includes a stator core 21 and plural (48 in the embodiment shown in the figures) coil bars 25.

The stator core 21 is made up, for example, of plural silicon steel sheets which are blanked out by a blanking press and, are laminated together and includes 48 teeth 22 which are provided on a radially inner side thereof and 48 slots 23 which are formed between the teeth 22, 22 which lie adjacent to each other. The slots 23 are formed so as to penetrate the stator core 21 in an axial direction thereof and have a substantially elliptic shape which is elongated in a radial direction of the stator core 21 when viewed from the axial direction thereof. The slots 23 also have opening portions 24 which are opened to an inner circumferential surface of the stator core 21.

Figure 4:
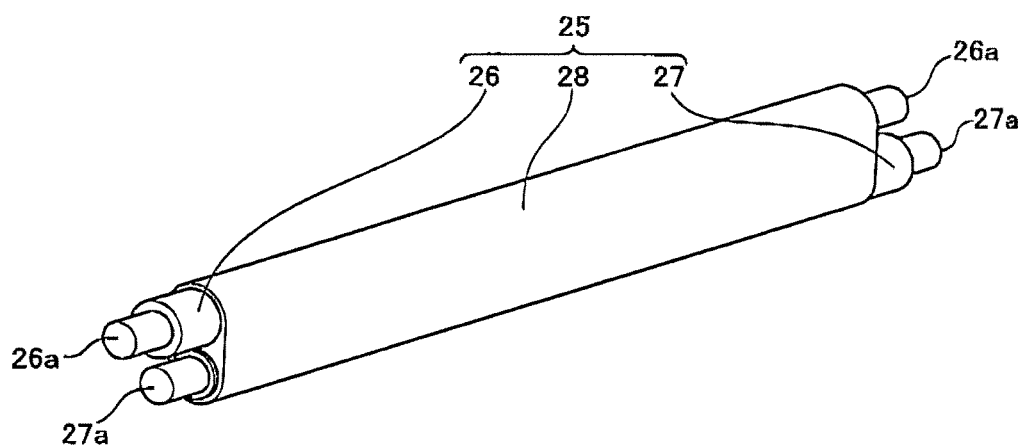
FIG. 4 is a perspective view of a coil bar.

Also, referring to FIG. 4, the coil bar 25 includes a radially outer coil bar 26 and a radially inner coil bar 27 which have the same shape and length. The radially outer coil bar 26 and the radially inner coil bar 27 are disposed parallel while being offset from each other in the axial direction by such an extent as a thickness of a connection coil 40, which will be described later. The radially outer coil bar 26 and the radially inner coil bar 27 are formed integrally by being covered on the periphery thereof by an insulation material 28 which is injection molded from a resin, with both ends of each coil bar left uncovered. Specifically, the length of each of the radially outer coil bar 26 and the radially inner coil, bar 27 is set to a length which is substantially equal to a sum of an axial length of the stator core 21 and a thickness of three connection coils 40, and small-diameter portions 26a, 27a are formed at both the ends of the radially outer coil bar 26 and the radially inner coil bar 27, respectively, the length of the small-diameter portions 26a, 27b being substantially equal to the thickness of the connection coil 40.

The plural (48 in the embodiment shown in the figures) coil bars 25, each made up of the radially outer coil bar 26 and the radially inner coil bar 27, are, as shown in FIG. 5, inserted individually in the 48 slots 23 in the stator core 21 so that the radially outer coil bars 26 are situated radially outwards and are then aligned in a circumferential direction of the stator core 21. Thus, the plural coil bars 25 make up the stator core assembly 20.

The radially outer coil bars 26 are inserted individually in the slots 23 so that the small-diameter portion 26a projects approximately by such an extent as a thickness of two connection coils 40 from one end face 21a (a left end face in FIG. 5) of the stator core 21, while the small-diameter portion 26a projects approximately by such an extent as the thickness of the connection coil 40 from the other end face 21b (a right end face in FIG. 5)

Additionally, the radially inner coil bars 27 are inserted individually in the slots 23 so that the small-diameter portion 27a projects approximately by such an extent as the thickness of the connection coil 40 from the one end face 21a of the stator core 21, while the small-diameter portion 26a projects approximately by such an extent as the thickness of two connection coils 40 from the other end face 21b. The insulation material 28 is interposed between the radially outer coil bar 26 and the radially inner coil bar 27 and the slot 23 in the stator core 21 so as to ensure the insulation between the radially outer and inner coil bars 26, 27 and the stator core 21. Consequently, the radially outer coil bar 26 and the radially inner coil bar 27 are covered by the insulation member 28 in such a state that the radially outer and inner coil bars 26, 27 are offset from each other in the axial direction so that the axial positions of the end portions thereof differ from each other.

The insulation material 28 which covers the radially outer coil bar 26 and the radially inner coil bar 27 has substantially the same shape as that of the slot 23 and is sized slightly larger than the slot 23. Thus, the insulation material 28 can easily be inserted in the slot 23 through press fitting. In addition, the radially outer coil bar 26 and the radially inner coil bar 27 are thicker than a conventional coil which is made up of a winding which is wound therearound, and hence, there is provided an advantage that the space factor relative to the slot 23 is increased.

As shown in FIGS. 1 to 7, the base plate assemblies 30L, 30R which are disposed individually at the ends of the stator core assembly 20 include base plates 31L, 31R and plural connection coils 40. The base plate assembly 30R differs from the base plate assembly 30L in that the former does not include a connecting terminal portion, which will be described later, and in that the shapes of grooves formed and the connection coils provided on the former differ from those of the latter. The other configurations of both the base plate assemblies are the same, and therefore, the base plate assembly 30L will mainly be described hereinafter.

Figure 6:
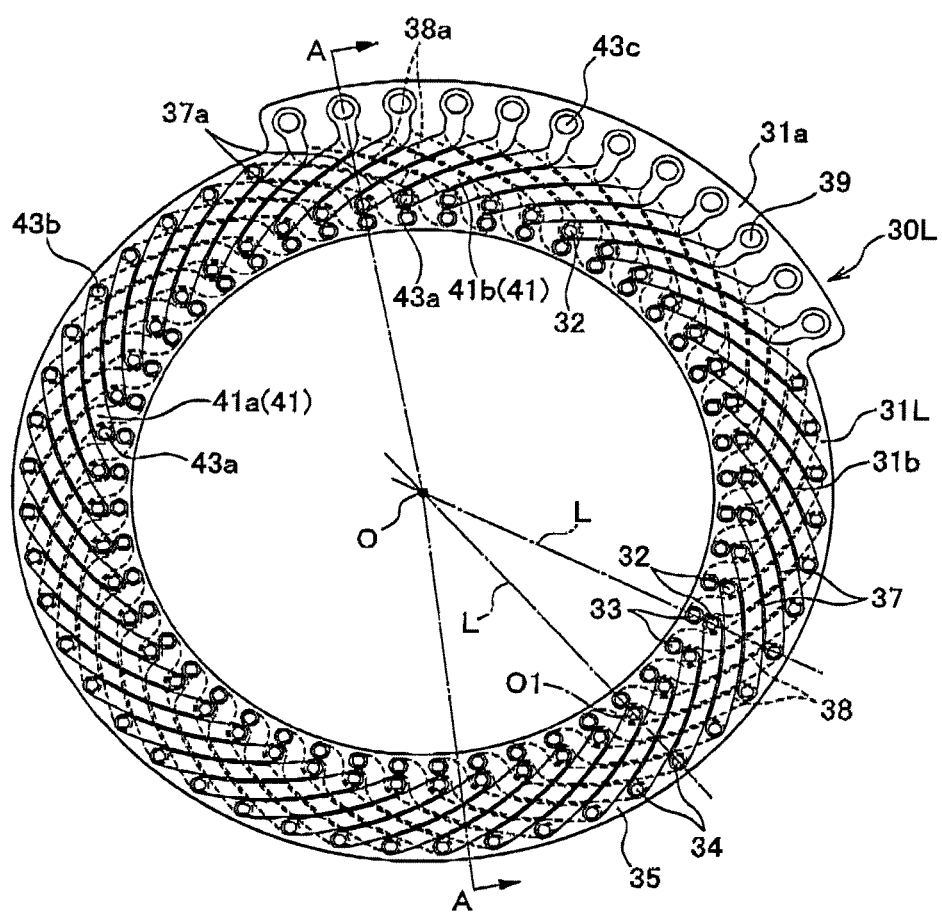
FIG. 6 is a front view of the one base plate assembly shown in FIG. 3A.
Figure 7:
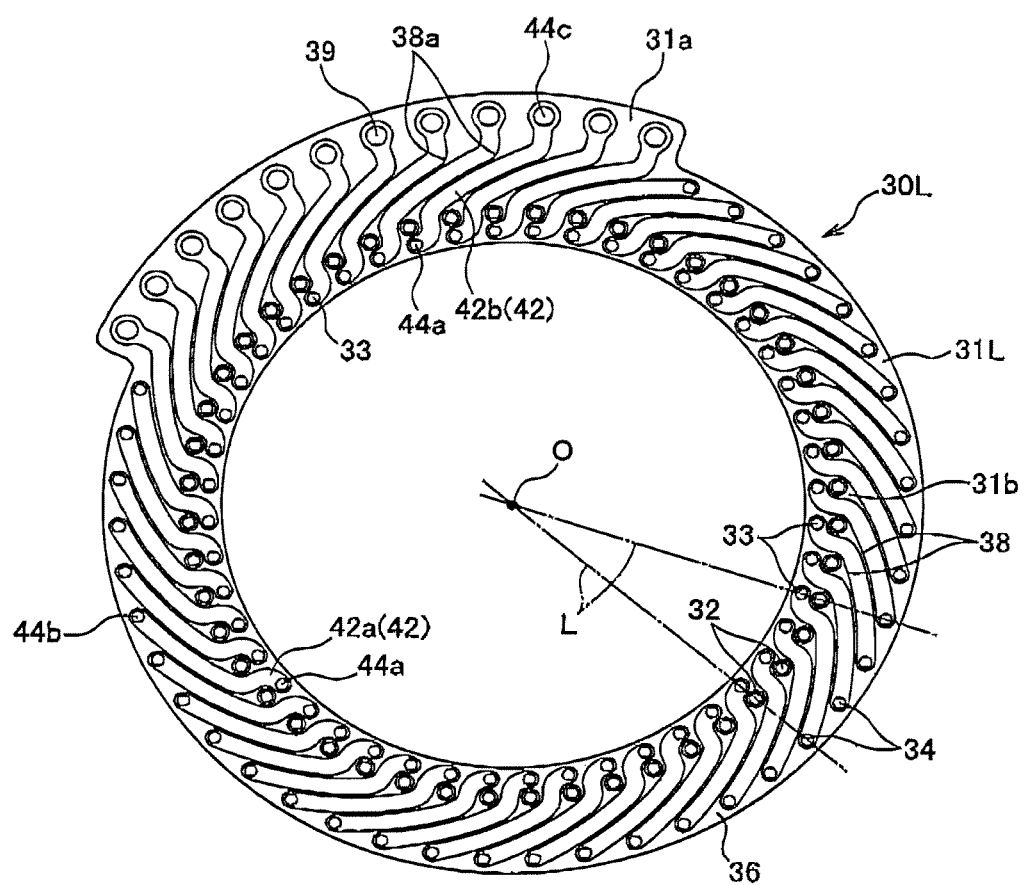
FIG. 7 is a rear view of the one base plate assembly shown in FIG. 3A.

As shown in FIGS. 6 and 7, the base plate 31L is formed from a resin having insulating properties and is a substantially annular member having substantially the same inside and outside diameters as those of the stator core 21. A deployment portion 31a is provided at an upper portion of the base plate 31L as seen in the figures so as to extend radially outwards therefrom into the shape of a segment. A connecting terminal portion is formed on the deployment portion 31a for connection to external equipment or the like.

48 pairs of radially outer through holes 32 and radially inner through holes 33 are formed to penetrate the base plate 31L at a radially inner side of the base plate 31L so a correspond, respectively, to the radially outer coil bars 26 and the radially inner coil bars 27 of the coil bars 25 which are inserted in the slots 23 in the stator core 21.

The radially outer through hole 32 and the radially inner through hole 33 which make a pair are situated on the same straight line L which extends from a center O of the base plate 31 in a radial direction. Further, a radially outermost hole 34 is formed on an outside diameter side of the base plate 31L. Thus, the radially outer and inner through holes 32, 33 and radially outermost hole 34 establish a communication between an outer surface 35 and an inner surface 36 of the base plate 31L (refer to FIG. 5). Additionally, in a circumferential position where the deployment portion 31a is formed, 12 connecting terminal joining holes 39 are formed which are situated further radially outwards than the position of the radially outermost hole 34 in the deployment portion 31a.

As shown in FIGS. 5 to 7, plural (48) outer surface grooves 37 and inner surface grooves 38 are formed along involute curves so as to lie close to one another on the outer surface 35 and the inner surface 36 of the base plate 31L, respectively. The outer surface grooves 37 and the inner surface grooves 38 are formed to have a U-shaped section which is opened to the outer surface 35 and the inner surface 36, respectively. The adjacent outer surface grooves 37 and the adjacent inner surface grooves 38 are isolated by walls 31b which is erected from the base plate 31L, and the outer surface groves 37 and the inner surface grooves 38 which face each other in an axial direction are isolated by a bulkhead 31c, whereby the outer surface grooves 37 and the inner surface grooves 38 are electrically insulated one by one.

In addition, the base plate 31 is given an axial width which is substantially equal to a sum of groove depths of the outer surface groove 37 and the inner surface groove 38 which correspond, respectively, to an outer connection coil 41 and an inner connection coil 42, which will both be described later, and a thickness of the bulkhead 31c.

In the base plate assembly 30L, as shown in a front view of the base plate in FIG. 6, each outer surface groove 37 on the base plate 31L is formed in a curved fashion along the involute curve so as to connect one radially outer through hole 32 with one radially outermost hole 34 which is formed on a straight line L which passes through a radially outer through hole 32 which lies three radially outer through holes ahead in a clockwise direction from the one radially outer through hole 32. In the plural outer surface grooves 37, however, 12 outer surface grooves 37a which extend towards the deployment portion 31a extend in an involute fashion from the corresponding radially outer through holes 32 to straight lines L which pass through the radially outer through holes 32 which lie three radially outer through holes ahead in the clockwise direction from the radially outer through holes 32 from which the outer surface grooves 37a start to extend and thereafter are bent radially outwards so as to connect to the corresponding connecting terminal joining holes 39.

As shown in a rear view of the base plate in FIG. 7, each inner surface groove 38 on the base plate 31 is formed in such a curved fashion as to avoid the interference with the corresponding radially outer through hole 32 so as to connect one radially inner through hole 33 with one radially outermost hole 34 which is formed on a straight line L which passes through a radially inner through hole 33 which lies three radially inner through holes ahead in a clockwise direction (in a counterclockwise direction when seen from the front side of the base plate 31L shown in FIG. 6) from the one radially inner through hole 33. In the plural inner surface grooves 38, however, 12 inner surface grooves 38a which extend towards the deployment portion 31a extend similarly in a curved fashion from the corresponding radially inner through holes 33 to straight lines L which pass through the radially inner through holes 33 which lie three radially inner through holes ahead in the clockwise direction (in the counterclockwise direction when seen from the front side of the base plate 31L shown in FIG. 6) from the radially inner through holes 33 from which the inner surface grooves 38a start to extend and thereafter are bent radially outwards so as to connect to the corresponding connecting terminal joining holes 39.

Namely, as shown in FIG. 6, the radially outer through hole 32 and the radially inner through hole 33 which are spaced six radially outer or inner through holes apart from each other in the clockwise direction (or in the counterclockwise direction) are connected to each other via the radially outermost hole 34 to which the outer surface groove 37 and the inner surface groove 38 commonly connect. In addition, the pair of outer surface groove 37a and inner surface groove 38a which connect to the common connecting terminal joining hole 39 connect the radially outer through hole 32 with the radially inner through hole 33 which are spaced six radially outer or inner through holes apart from each other in the clockwise direction (or in the counterclockwise direction).

In the base plate assembly 30R, each outer surface groove 37 on the base plate 31R has the same shape of each inner surface groove 38 on the base plate 31L, and each inner surface groove 38 on the base plate 31R has the same shape as each outer surface groove 37 on the base plate 31L.

The connection coil 40 is formed of a conductive material such as copper into the shape of a plate. The connection coils 40 are divided into outer connection coils 41 (41a, 41b) which are inserted in the outer surface grooves 37, 37a and inner connection coils 42 (42a, 42b) which are inserted in the inner surface grooves 38, 38a. When referred to herein, the outer connection coils 41 are the connection coils 40 which are disposed on an axially outer side of the stator 10 when the stator core assembly 20 and the base plate assemblies 30 are assembled together, and the inner connection coils 42 are the connection coils 40 which are disposed on an axially inner side of the stator 10.

As shown in FIG. 6, the outer connection coils 41a are formed along the involute curves having the same shape of the outer surface grooves 37, and connection holes 43a, 43b are formed at both end portions of the outer connection coils 41a. The connection hole 43a has a diameter which is substantially the same as that of the small-diameter portion 26a of the radially outer coil bar 26, and the connection hole 43b has a diameter which is substantially the same as that of a connecting pin 45, which will be described later, for connecting together the outer connection coil 41a and the inner connection coil 42a. In addition, the outer connection coils 41b are formed in a curved fashion to have the same shape as that of the outer surface grooves 37a, and connection holes 43a and connecting terminal holes 43c are formed at both end portions of the outer connection coils 41b.

As shown in FIG. 7, the inner connection coils 42a are formed along the involute curves having the same shape of the inner surface grooves 38, and connection holes 44a, 44b are formed at both end portions of the inner connection coils 42a. The connection hole 44a has a diameter which is substantially the same as that of the small-diameter portion 27a of the radially inner coil bar 27, and the connection hole 44b has a diameter which is substantially the same as that of the connecting pin 45. In addition, the inner connection coils 42b are formed in a curved fashion to have the same shape as that of the inner surface grooves 38a, and connection holes 44a and connecting terminal holes 44c are formed at both end portions of the inner connection coils 42b.

Consequently, except for the portion of the base plate 31L where the connecting terminal joining holes 39, the inner connection coils 42a and the outer connection coils 41a, 41b that are all connected to the radially outer coil bars 26 are formed along the involute curves, and the inner connection coils 42a, 42b and the outer connection coils 41a that are all connected to the radially inner coil bars 27 are formed along the involute curves so as to extend radially outwards from the radially inner through holes 33 on a radially inner side of the involute curves.

The outer connection coils 41a, 41b are inserted in the outer surface grooves 37, 37a, respectively, and the inner connection coils 42a, 42b are inserted in the inner surface grooves 38, 38a, respectively. The conductive connecting pins 45 which are made of copper or aluminum are inserted in the radially outermost holes 34 so as to electrically connect the outer connection coils 41a and the inner connection coils 42a.

By so doing, the base plate assemblies 30L, 30R are built up in such a state that the connection holes 43a of the outer connection coils 41a and the connection holes 44a of the inner connection coils 42a which are disposed six connection holes apart from each other in the clockwise direction (or in the counterclockwise direction) are electrically connected via the outer connection coils 41a, the connecting pins 45 and the inner connection coils 42a.

In place of providing the connecting pins 45 as in this embodiment, a configuration may be adopted in which projecting portions having the same shape of the connecting pin 45 are formed integrally on either of the outer connection coils 41a and the inner connection coils 42a, so that the projecting portions so formed are inserted in connection holes 43b, 44b which are provided on the other of the outer connection coils 41a and the inner connection coils 42a, whereby the outer connection coils 41a and the inner connection coils 42a are electrically connected to each other.

The pair of base plate assemblies 30L, 30R, which are configured as has been described heretofore, are disposed in the predetermined positions on both the ends of the stator core assembly 20 so as to be assembled thereto. As shown in FIG. 5, in the base plate assembly 30L which is disposed at the one end face 21a (the left end face in the figure) of the stator core 21, the small-diameter portions 26a of the radially outer coil bars 26 are inserted in the connection holes 43a of the outer connection coils 41a, 41b, and the small-diameter portions 27a of the radially inner coil bars 27 are inserted in the connection holes 44a of the inner connection coils 42a, 42b. Thereafter, the small-diameter portions 26a, 27a are crimped to be fixed in place in the corresponding connection holes 43a, 44a. Namely, the outer connection coils 41a, 41b and the inner connection coils 42a, 42b connect together the coil bars 25 of the same phase (for example, a U-phase) to thereby form extending portions of a coil 50.

In the base plate assembly 30R which is disposed at the other end face 21b (the right end face in the figure) of the stator core 21, the small-diameter portions 26a of the radially outer coil bars 26 are inserted in the connection holes 44a of the inner connection coils 42a, and the small-diameter portions 27a of the radially inner coil bars 27 are inserted in the connection holes 43a of the outer connection coils 41a. Thereafter, the small-diameter portions 26a, 27a are crimped to be fixed in place in the corresponding connection holes 43a, 44a. Namely, the outer connection coils 41a and the inner connection coils 42a connect together the coil bars 25 of the same phase (for example, the U-phase) to thereby form extending portions of the coil 50.

Consequently, with respect to the radially outer coil bar 26 and the radially inner coil bar 27 which are disposed in the same slot 23, the outer connection coil 41a which is connected to the one end (the left end in the figure) of the radially outer coil bar 26 extends radially outwards and in the clockwise direction to connect to the inner connection coil 42a of the same phase, while the inner connection coil 42a which is connected to the other end (the right end in the figure) of the radially outer coil bar 26 extends radially outwards and in the counterclockwise direction to connect to the outer connection coil 41a of the same phase. In addition, the inner connection coil 42a which is connected to the one end (the left end in the figure) of the radially inner coil bar 27 extends radially outwards and in the counterclockwise direction to connect to the outer connection coil 41a of the same phase, while the outer connection coil 41a which is connected to the other end (the right end in the figure) of the radially inner coil bar 27 extends radially outwards and in the clockwise direction to connect to the inner connection coil 42a of the same phase.

Figure 8:
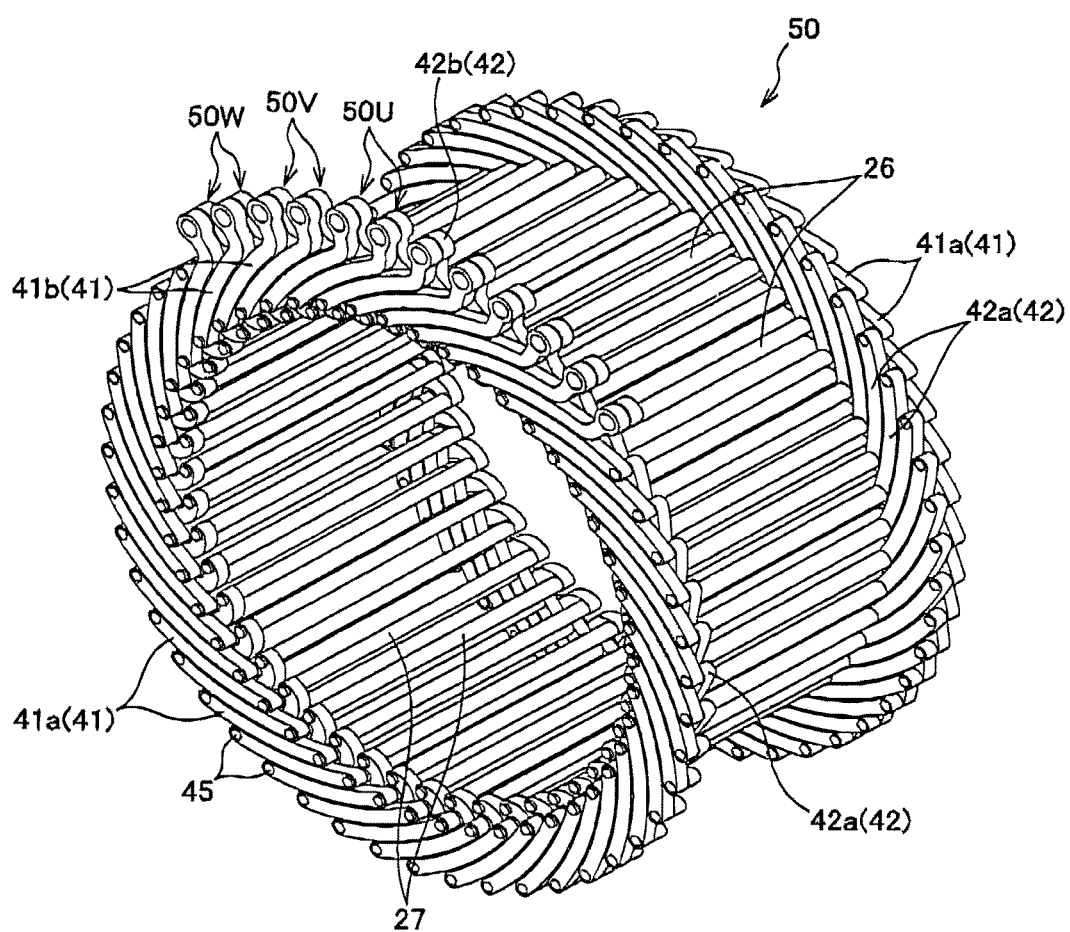
FIG. 8 is a perspective view of double-slot type, segmented coils of plural phases.
Figure 9:
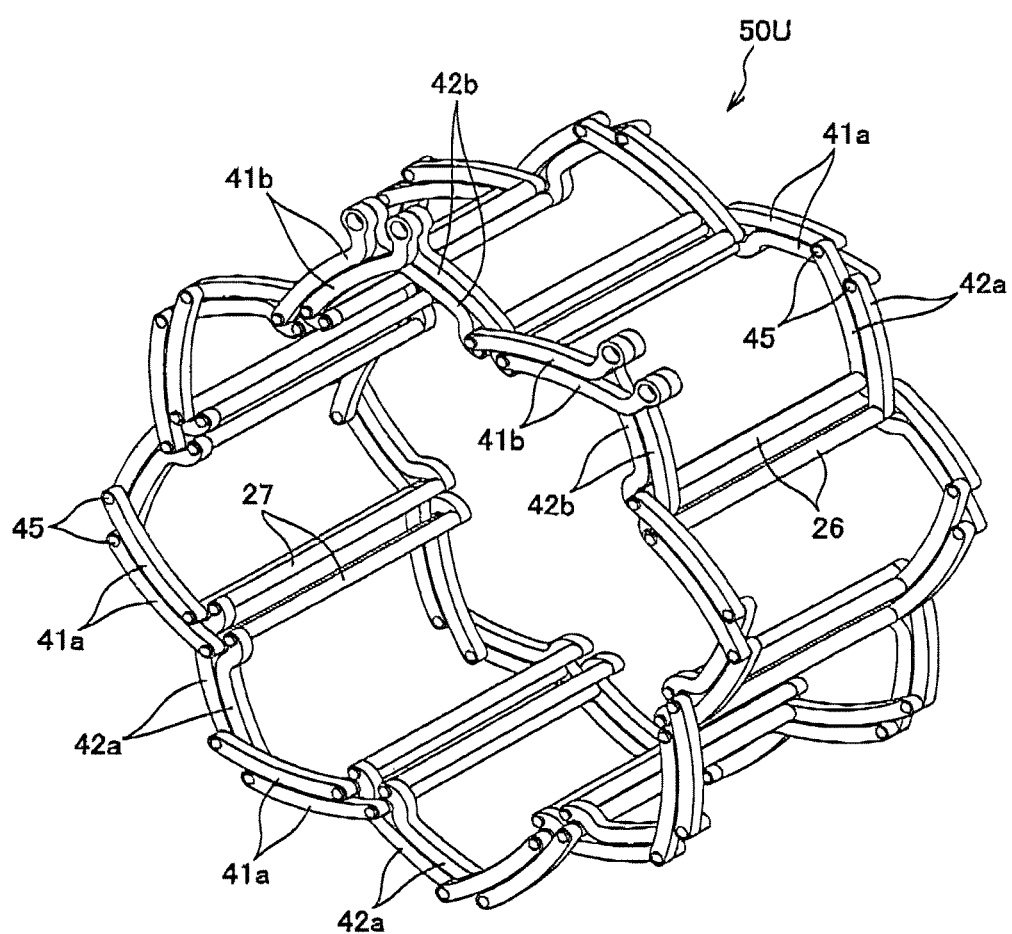
FIG. 9 is a perspective view of coils of one phase which are taken out from the coils of the plural phases shown in FIG. 8.
Figure 10:
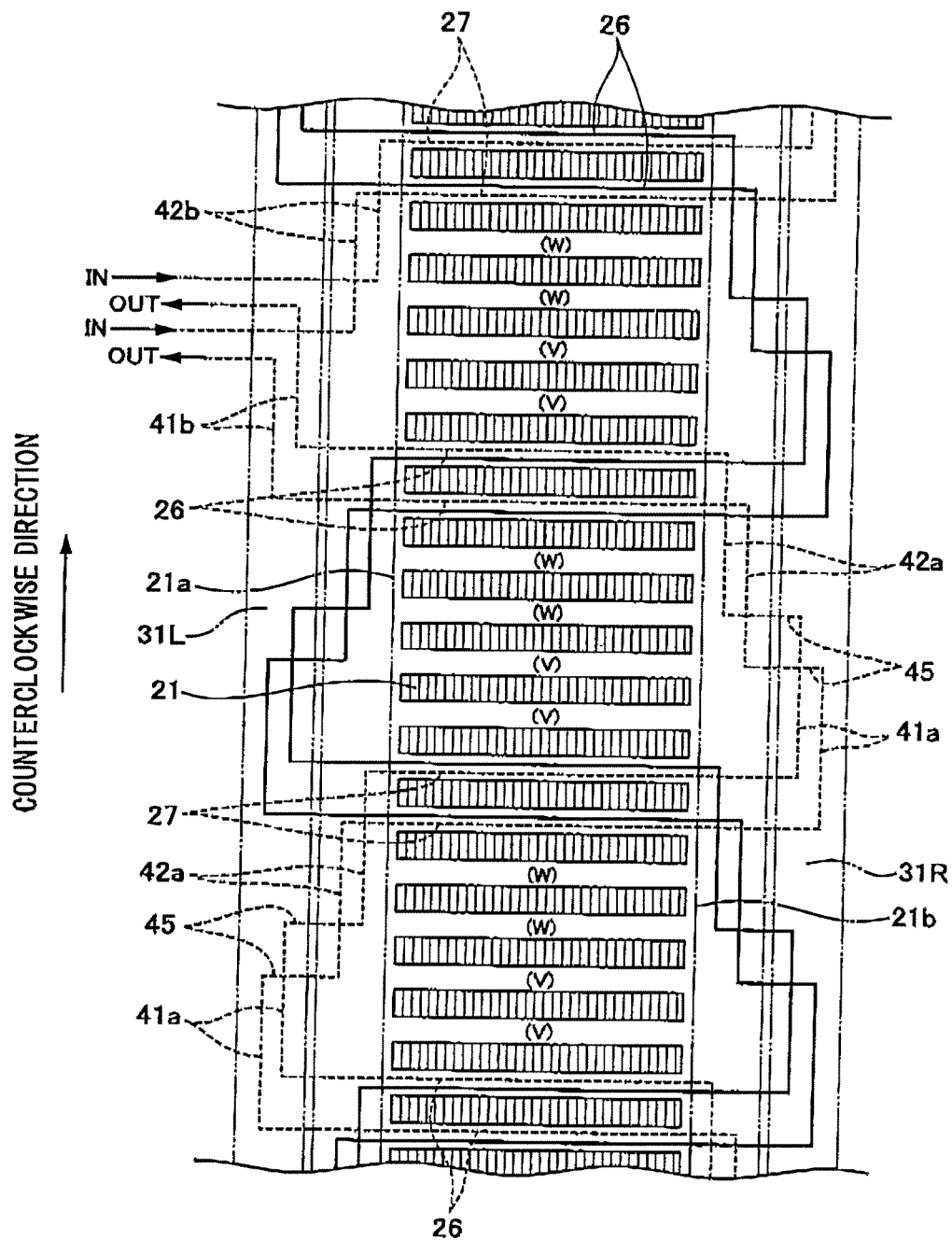
FIG. 10 is an exemplary diagram showing the configuration of the coils of the plural phases.

In this way, the stator 10 is made up by assembling the pair of base plate assemblies 30L, 30R to both the ends of the stator core assembly 20, whereby segmented coils 50 make up four coil loops for each phase which has the same construction (U-phase coils 50U, V-phase coils 50V, and W-phase coils 50W). In these coil loops of the three phases (the U-phase coils 50U, the V-phase coils 50V, and the W-phase coils 50W), two coil loops make up a set, and hence, two sets of U-phase coils 50U, two sets of V-phase coils 50V, and two sets of W-phase coils 50W are wave wound in the counterclockwise direction in this order (refer to FIGS. 8 and 10). Then, the radially outer coil bar 26 and the radially inner coil bar 27 which are covered together by the insulation material 28 to be disposed within the same slot 23 each include two coils which make up one set. FIG. 8 is a perspective view of double-slot type, segmented coils of plural phases (U-, V- and W-phase) which are taken out from the stator for better understanding, and FIG. 9 is a perspective view of coils of one phase (for example, U-phase) which are taken out, in turn, from the coils of the plural phases. FIG. 10 is an exemplary diagram showing the configuration of the coils of the plural phases, FIG. 11A is a partial enlarged view of FIG. 6, and FIG. 11B is a sectional view taken along the line B-B in FIG. 11A.

Additionally, in the stator 10 which is configured in the way described heretofore, the outer connection coils 41a, 41b and the inner connection coils 42a, 42b are disposed within a region where the stator core 21 is projected in the axial direction and are disposed in different positions with respect to the axial direction.

Figure 11A:
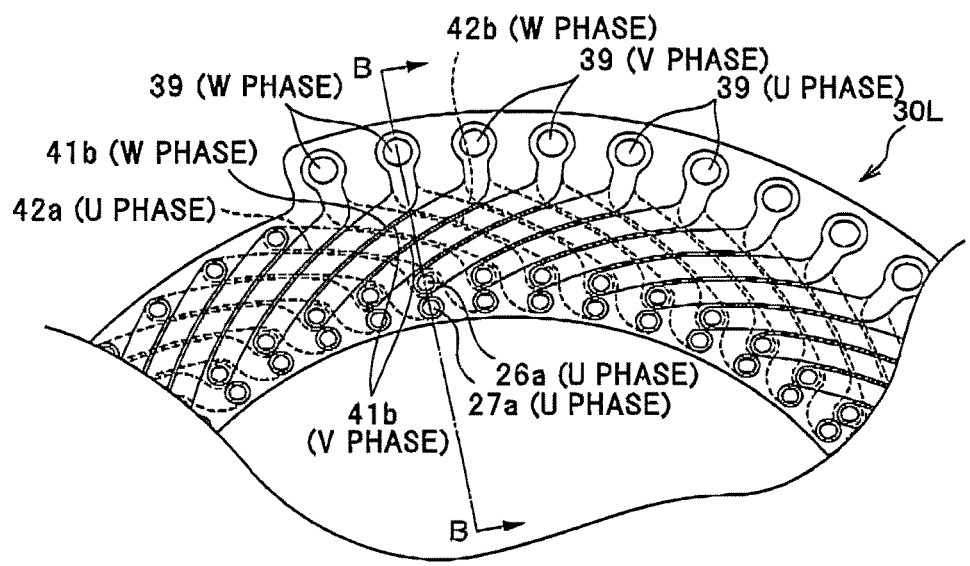
FIG. 11A is a partial enlarged view of FIG. 6.
Figure 11B:
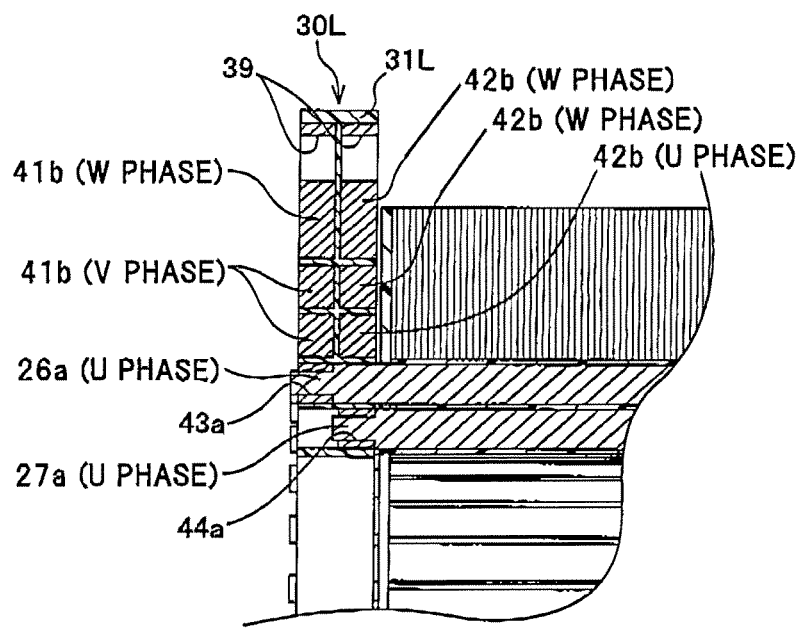
FIG. 11B is a sectional view taken along the line B-B in FIG. 11A.

In the sectional view of the base plate assembly 30L taken along the line B-B which is shown in FIG. 11A, as shown in FIG. 11B, on the outer surface of the base plate 31L, two V-phase outer connection coils 41b and one W-phase outer connection coil 41b are aligned in this order from in a radially inward to outward direction at the small-diameter portion 26a of the U-phase radially outer coil bar 26 from a radially inner side, while on the inner surface of the base plate 31L, one U-phase connection coil 42b and two W-phase inner connection coils 42b are aligned in this order from the radially inner. Consequently, as is clear from FIG. 11A, the inner connection coils 42a, 42b face the outer connection coils 41a, 41b of the different phase in the axial direction, and the outer connection coils 41a, 41b face the inner connection coils 42a, 42b of the different phase in the axial direction.

In addition, outer surfaces of the plural outer connection coils 41a, 41b which are disposed at the axially outer ends of the stator 10 are level with the end faces of the base plates 31L, 31R.

Additionally, as is shown in FIG. 5, the coils 50 are assembled to the stator 10 so that the outer connection coils 41a, 41b which connect to the radially outer coil bars 26 are situated axially outwards at the one end face 21a of the stator core 21, while at the other end face 21b of the stator core 21, the outer connection coils 41a which connect to the radially inner coil bars 27 are situated axially outwards.

Figure 12A:
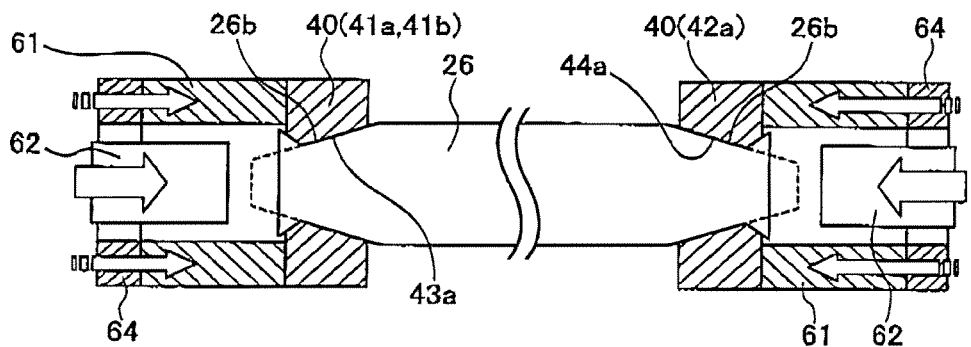
FIG. 12A is an exemplary diagram showing a state in which a coil bar and connection coils are connected together through crimping.
Figure 12B:
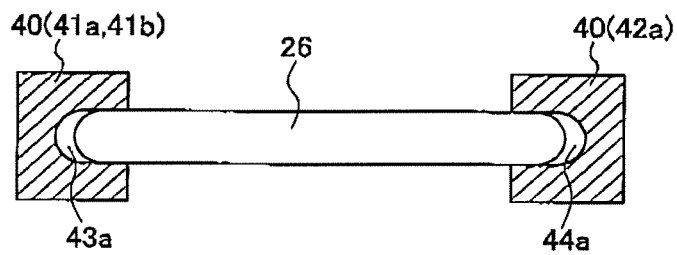
FIG. 12B is an exemplary diagram showing a state in which a coil bar having semi-spherical end portions is connected to connection coils through press fitting.
Figure 12C:
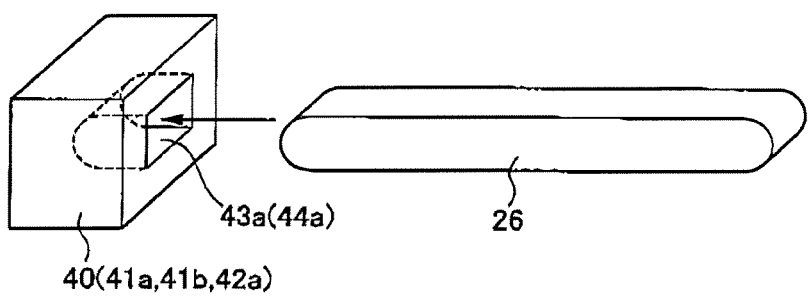
FIG. 12C is an exemplary diagram showing a state in which a coil bar having semi-circular end portions and a rectangular cross section is connected to connection coils by being press fitted in holes in the connection coils.

FIGS. 12A to 12C show conceptual diagrams showing connecting constructions between a coil bar and connection coils. Hereinafter, the radially outward coil bar 26 is taken as an example for description. However, connecting constructions which will be described below can also be applied to the radially inner coil bar 27. In a radially outer coil bar 26 shown at FIG. 12A, tapered portions 26b which are tapered towards ends of the radially outer coil bar 26 are formed at both end portions, and a connection hole 43a in an outer connection coil 41a or 41b and a connection hole 44a in an inner connection coil 42a are made into a tapered hole having a gradient which is substantially equal to that of the end portions of the radially outer coil bar 26. The radially outer coil bar 26 and the connection coils 40 are assembled together so that the base plates 31L, 31R are assembled to the stator core 21 and the connection coils 90 are then pressed axially relative to the radially outer coil bar 26 by pressing members 61 of jigs by virtue of elastic forces of springs 64, whereby the connection holes 43a, 44a of the connection coils 40 are fitted on the tapered portions 26b of the radially outer coil bar 26. Then, the end portions of the radially outer coil bar 26 are crimped by being crushed to be deformed at ends by a punch 62, whereby the coil bar 26 and the connection coils 40 are fixed together.

As this occurs, the fitting portions between the radially outer coil bar 26 and the connection coils 40 are tapered, and therefore, even in case centers of the radially outer coil bar 26 and the connection coils 40 are offset slightly, the radially outer coil bar 26 and the connection coils 40 are centered by virtue of pressures applied thereto by the pressing members 61 so that the radially outer coil bar 26 and the connection coils 40 are joined together at the tapered portions 26b in an ensured fashion to thereby establish an electric communication therebetween. In addition, such joining can be executed at plural locations (96 locations in this embodiment) through a single pressing operation. Thus, the joining work can be executed efficiently, thereby making it possible to increase the fabrication efficiency remarkably. It should be noted that the coil bar 25 and the connection coils 40 do not necessarily have to be connected together by press fitting and crimping, and hence, they may be connected together by press fitting or crimping. Thus, a connection of the coil bar 25 and the connection coils 40 based on press fitting will be described below.

End portions of a radially outer coil bar 26, shown in FIG. 12B, are formed into a semi-spherical shape, and connection holes 43a, 44a of connection coils 40 are formed into a semi-spherical depressed portion. In this construction, the semi-spherical end portions of the radially outer coil bar 26 are press fitted in the connection holes 43a, 44a of the connection coils 40, whereby the radially outer coil bar 26 and the connection coils 40 are joined together. In this construction, too, the radially outer coil 26 and the connection coils 40 can be centered. In addition, such joining can be executed at plural locations through a single pressing operation, whereby the radially outer coil 26 and the connection coils 40 can be joined together extremely efficiently.

A radially outer coil bar 26, shown in FIG. 12C, is formed to have a rectangular cross section, and end portions thereof are formed into a semicircular shape. In addition, connection holes 43a, 44a of connection coils 40 are similarly formed into a semicircular depressed portion, and the radially outer coil bar 26 and the connection coils 40 are joined together by press fitting the end portions of the radially outer coil 26 into the connection holes 43a, 44a which are the semicircular depressed portions. Being given the rectangular cross section, the radially outer coil bar 26 of this embodiment has an angular shape which closely matches that of the slot 23, and therefore, the space factor of the slot 23 can also be enhanced.

Figure 13:
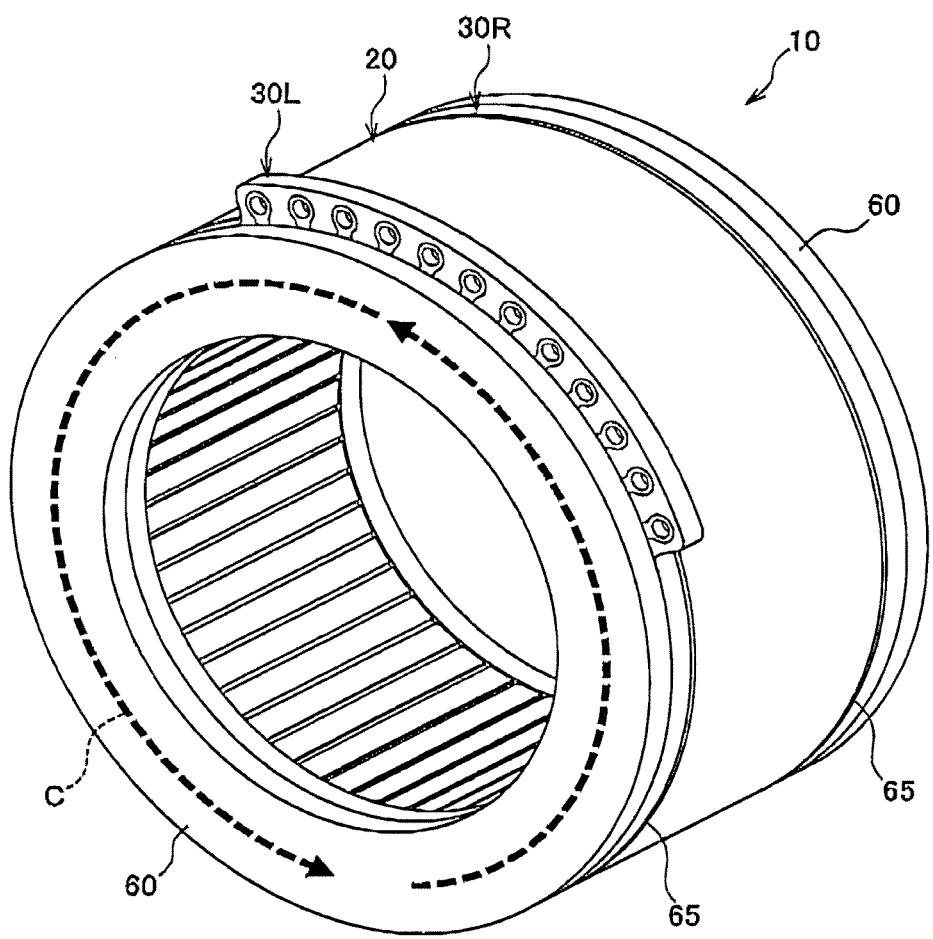
FIG. 13 is a perspective view of the stator in which cooling plates are disposed on end faces of the base plate assemblies.
Figure 14:
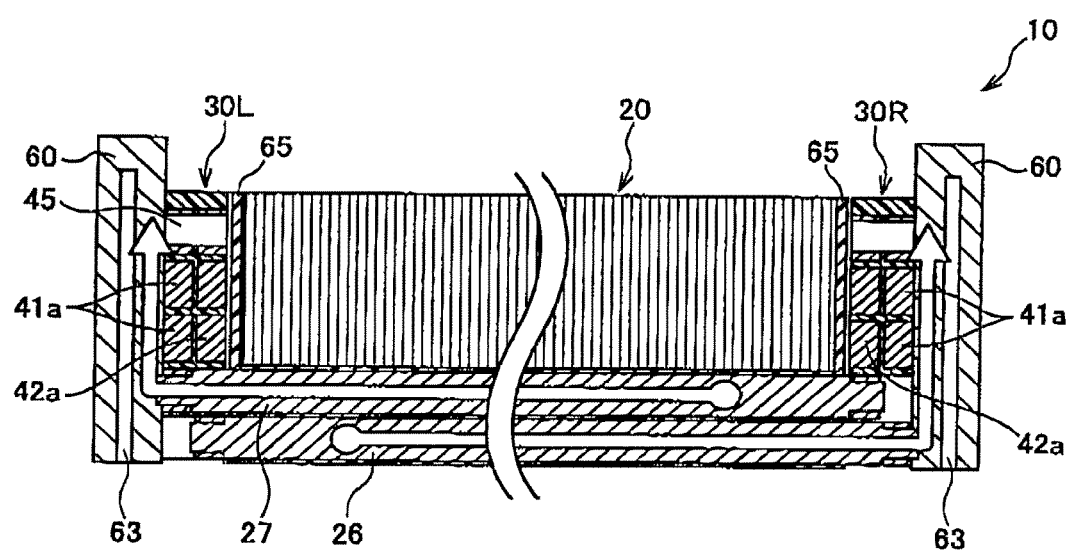
FIG. 14 is a vertical sectional view of a main part of the stator including the cooling plates shown in FIG. 13.

FIG. 13 is a perspective view of the stator in which cooling plates are disposed at end faces of the base plate assemblies, and FIG. 14 is a vertical sectional view of a main part of the stator. As shown in FIGS. 13 and 14, a pair of cooling plates 60 are disposed so as to be in contact with the base plate assemblies 30 which are provided at both the end faces of the stator 10. A refrigerant passageway 63 is formed in an interior of the cooling plate 60 so that a refrigerant is allowed to circulate therein. Then, a refrigerant which is sent under pressure from a refrigerant supply system, not shown, is circulated in, for example, a direction indicated by an arrow C (refer to FIG. 13) in the refrigerant passageway 63 in the cooling plate 60. Thus, the stator 10 can be cooled positively via the outer connection coils 41a, 41b (the extending portions) of the stator 10 with which the pair of cooling plates 60 are in contact.

Additionally, front surfaces of the outer connection coils 41a, 41b are flat, and therefore, the outer connection coils 41a, 41b are brought into surface contact with the cooling plates 60. Because of this, compared with a conventional coil around which a winding is wound, the contact area with the cooling plates 60, that is, the heat conduction area is large, thereby making it possible to cool the stator 10 efficiently.

Additionally, in the coils 50, at the one end face 21a of the stator core 21, the outer connection coils 41a, 41b which connect to the radially outer coil bars 26 are situated axially outwards, while at the other end face 21b of the stator core 21, the outer connection coils 41a which connect to the radially inner coil bars 27 are situated axially outwards. Therefore, the radially outer coil bars 26 and the radially inner coil bars 27 are cooled uniformly via the outer connection coils 41a, 41b to thereby suppress the heat distribution of the coils. Further, the coils 50 are free from concerns caused when an oil cooling process using an ATF oil or the like is selected that the coils and the insulation materials are badly affected by the ATF oil which is sprayed to the coils, the reliability and durability of the stator being thereby enhanced.

Thus, as has been described heretofore, the stator 10 according to this embodiment includes the stator core 21 and the segmented coils 50 of plural phases, and the segmented coils 50 of plural phases have the plural coil bars 25 which are inserted individually in the plural slots 23 in the stator core 21 and which extend substantially in the straight line and the plural connection coils 40 which connect together the coil bars 25 of the same phase to thereby make up the extending portions. The connection coils 40 each includes the inner connection coil 42 and the outer connection coil 41 which are disposed in the different axial positions, and the inner connection coil 42 faces the outer connection coil 91 of the different phase in the axial direction, while the outer connection coil 41 faces the inner connection coil 42 of the different phase in the axial direction. Therefore, the extending portions which connect together the coil bars 25 of the same phase are disposed in the different axial positions, whereby the axial projection of the extending portions can be suppressed, thereby making it possible to reduce the size of the stator 10. In addition, the copper loss can be suppressed as a result of the length of the extending portions being reduced, the performance of the electric rotary machine being thereby enhanced.

In addition, the pair of base plates 31L, 31R are provided at both the ends of the stator core 21, and in each of the pair of base plates 31L, 31R, the plural grooves 37, 38 are formed on the outer surface 35 and the inner surface 36 thereof which face each other, respectively. The outer connection coils 41 are disposed in the grooves 37 which are formed on the outer surface 35, while the inner connection coils 42 are disposed in the grooves 38 which are formed on the inner surface 36. Therefore, the extending portions are disposed in the different axial positions efficiently in such estate that the extending portions are insulated by each of the base plates 31L, 31R, whereby not only can the size of the stator 10 be reduced, but also the assembling properties of the segmented coils 50 can be enhanced.

Further, the coil bars 25 which are inserted individually in the slots 23 each include the radially outer coil bar 26 and the radially inner coil bar 27 which are aligned in the radial direction, and the radially outer coil bar 26 is connected to the outer connection coil 41 at one end and is connected to the inner connection coil 42 at the other end thereof, while the radially inner coil bar 27 is connected to the inner connection coil 42 at one end and is connected to the outer connection coil 41 at the other end thereof. Therefore, the outer and inner connection coils 41, 42 can be connected to the two coil bars 26, 27 which extend from the slot 23 in the form of a wave winding.

In addition, the radially outer coil bar 26 and the radially inner coil bar 27 are connected to the outer connection coils 41 which are positioned axially outwards of the stator 10 on either end face of the stator core 21. By adopting this configuration heat generated in the stator 10 is dissipated via the outer connection coils 41, thereby making it possible to cool the radially outer coil bar 26 and the radially inner coil bar 27 uniformly. The stator 10 can be cooled further efficiently when the cooling plates 60 are disposed so as to be in contact with the outer connection coils 41 which are situated at the axial outer ends of the stator 10.

Additionally, the outer connection coil 41 connected to the radially outer coil bar 26 at the one end thereof extends radially outwards and in one of the clockwise direction and the counterclockwise direction to thereby be connected to the inner connection coil 42 of the same phase, the inner connection coil 42 connected to the radially outer coil bar 26 at the other end thereof extends radially outwards and in the other of the clockwise direction and the counterclockwise direction to thereby be connected to the outer connection coil 41 of the same phase, the inner connection coil 42 connected to the radially inner coil bar 27 at the one end thereof extends radially outwards and in the other of the clockwise direction and the counterclockwise direction to thereby be connected to the outer connection coil 41 of the same phase, and the outer connection coil 41 connected to the radially inner coil bar 27 at the other end thereof extends radially outwards and in the one of the clockwise direction and the counterclockwise direction to thereby be connected to the inner connection coil 42 of the same phase. By adopting this configuration, the outer and inner connection coils 41, 42 can be connected to the coil bars 26, 27 which extend from the slot 23 radially outwards of the outer and inner coil bars 26, 27, and the rotor can easily be disposed inside the stator 10, thereby making it possible to connect the connection coils 40 with the coil bars 25 in the form of a wave winding.

Additionally, in each of the base plates 31L, 31R, the radially inner through hole 33 and the radially outer through hole 32 in which the radially inner coil bar 27 and the radially outer coil bar 26 which are disposed in the same slot 23 in the stator core 21 are inserted, respectively, are formed so as to be aligned in the radial direction, and the inner connection coil 42 and the outer connection coil 41 which are connected to the radially outer coil bar 26 are formed so as to extend along the involute curve. Further, the inner connection coil 42 and the outer connection coil 41 which are connected to the radially inner coil bar 27 are formed so as to extend along the involute curve while being bent on the radially inner side of the involute curve so as to extend radially outwards from the radially inner through hole 33 while extending around the radially outer through hole 32. Therefore, the inner connection coil 42 and the outer connection coil 41 do not interfere with each other within each of the base plates 31L, 31R, thereby making it possible to reduce the area occupied by them.

In addition, the radially outer coil bar 26 and the radially inner coil bar 27 are made to have the same length, whereby parts for coil bars 25 can be commonized.

Additionally, the plural connection coils 40 are disposed within the region where the stator core 21 is projected in the axial direction, and therefore, the size of the stator 10 in the radial direction can be reduced. Additionally, the rotor can easily be disposed inside the stator 10.

It should be noted that the invention is not limited to the embodiment that has been described heretofore and hence can be modified or improved as required.

For example, in the embodiment, 12 connecting terminal joining holes 39 are formed. However, the invention is not limited thereto, and hence, a configuration may be adopted in which six connecting terminal joining holes 39 are formed, and adjacent connection coils of the same phase are connected together.

Additionally, an insulation cover may be disposed at the axially outer ends of the pair of base plate assemblies 30L, 30R. Alternatively, the axially outer ends may be covered with a resin or the like.

Figure 15:
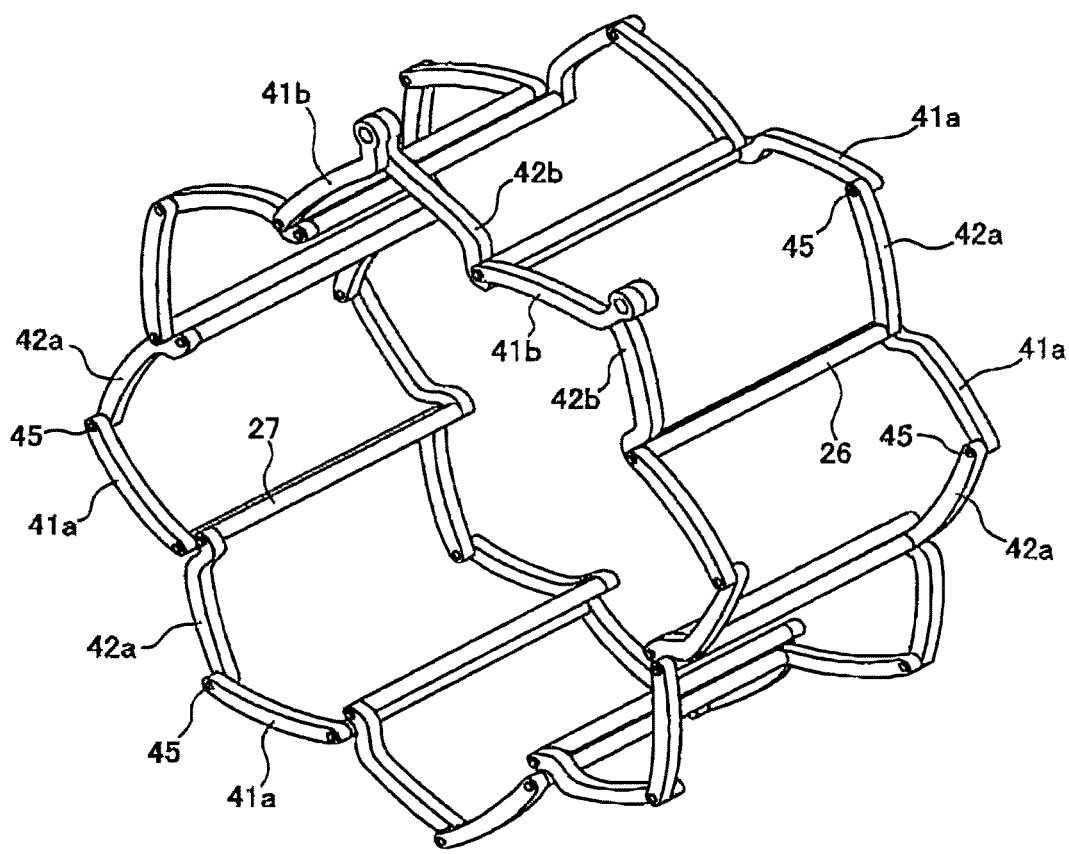
FIG. 15 is a perspective view of coils of one phase making up single-slot type coils of plural phases.
Figure 16:
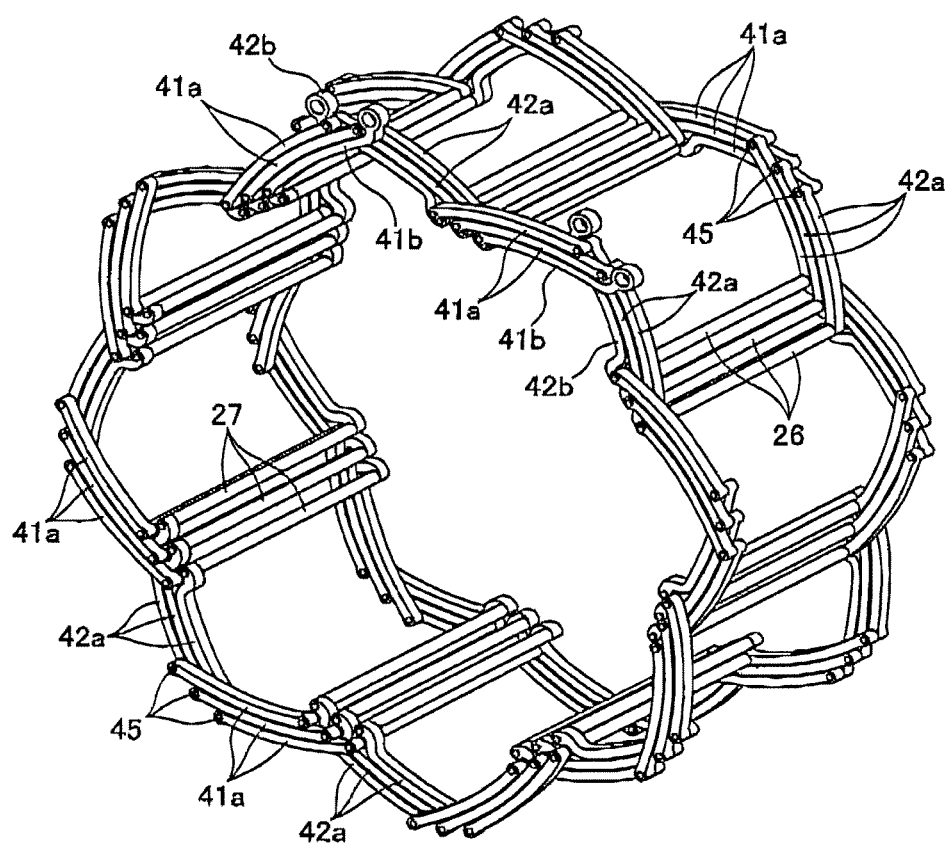
FIG. 16 is a perspective view of coils of one phase making up triple-slot type coils of plural phases.

The stator 10 of the invention is not limited to the double-slot type stator that has been described above. For example, the stator 10 can be configured as a single-slot type stator of which the shape of coils of one phase is shown in FIG. 15 or can be configured as a triple-slot type stator of which the shape of coils of one phase is shown in FIG. 16. In a three-phase, eight-pole, wave wound stator, in the case of the single-slot type stator, the number of slots in the stator core 21 is 24, and in the case of the triple-slot type stator, the number of slots in the stator core 21 is 72.

What is claimed is:

1. A stator for an electric rotary machine comprising:
   a stator core having: a back yoke having a circular shape; a plurality of teeth extending in an inner radial direction of the back yoke; and a plurality of slots being provided between the plurality of teeth; and
   segmented coils of a plurality of phases, wherein:
   the segmented coils of a plurality of phases have pluralities of coil bars which are inserted individually in the plurality of slots in the stator core and which extend substantially in a straight line and pluralities of connection coils which connect together the coil bars of the same phase to thereby make up extending portions;
   the connection coils each comprise an inner connection coil and an outer connection coil which are disposed in different axial positions, wherein the inner connection coil and the outer connection coil are disposed opposite each other on opposite ends of the stator core;
   the inner connection coil faces an outer connection coil of a different phase in an axial direction and the outer connection coil faces the inner connection coil of a different phase in the axial direction;
   one end of the inner connection coil and one end of the outer connection coil are connected to each other by a same coil bar at a plurality of connection holes on the inner connection coil bar and at a plurality of connection holes on the outer connection coil bar, and the other end of the inner connection coil and the other end of the outer connection coil extend in a radially outwards direction toward a position facing the back yoke in the axial direction;
   the inner connection coil is electrically connected to the outer connection coil of the same phase in the radially outwards direction;
   one of the coil bars is electrically connected to one of the coil bars of the same phase which is inserted into a different slot; and
   the other end of the inner connection coil and the other end of the outer connection coil are connected with each other at the position facing the back yoke in the axial direction.

2. The stator core for an electric rotary machine according to claim 1, wherein:
   a pair of base plates are provided at both ends of the stator core;
   in each of the pair of base plates, a plurality of grooves are formed on each of an outer surface and an inner surface thereof which face each other;
   the outer connection coils are disposed in the grooves which are formed on the outer surface; and
   the inner connection coils are disposed in the grooves which are formed on the inner surface.

3. The stator for an electric rotary machine according to claim 1, wherein:
   the coil bars which are inserted individually in the slots each comprise a radially outer coil bar and a radially inner coil bar which are aligned in a radial direction;
   one of the radially outer coil bar and the radially inner coil bar is connected to the outer connection coil at one end and is connected to the inner connection coil at the other end thereof; and
   the other of the radially outer coil bar and the radially inner coil bar is connected to the inner connection coil at one end and is connected to the outer connection coil at the other end thereof.

4. The stator for an electric rotary machine according to claim 3, wherein:
   the outer connection coil connected to the radially outer coil bar at the one end thereof extends radially outwards and in one of a clockwise direction and a counterclockwise direction to thereby be connected to an inner connection coil of the same phase;

the inner connection coil connected to the radially outer coil bar at the other end thereof extends radially outwards and in the other of the clockwise direction and the counterclockwise direction to thereby be connected to an outer connection coil of the same phase;

the inner connection coil connected to the radially inner coil bar at the one end thereof extends radially outwards and in the other of the clockwise direction and the counterclockwise direction to thereby be connected to an outer connection coil of the same phase; and the outer connection coil connected to the radially inner coil bar at the other end thereof extends radially outwards and in the one of the clockwise direction and the counterclockwise direction to thereby be connected to an inner connection coil of the same phase.

5. The stator for an electric rotary machine according to claim 4, wherein:

in each of the base plates, a radially inner through hole and a radially outer through hole in which the radially inner coil bar and the radially outer coil bar which are disposed in the same slot in the stator core are inserted, respectively, are formed so as to be aligned in the radial direction;

the inner connection coil and the outer connection coil which are connected to the radially outer coil bar are formed so as to extend along an involute curve; and the inner connection coil and the outer connection coil which are connected to the radially inner coil bar are formed so as to extend along an involute curve while being bent at a radially inner end of the involute curve so as to extend radially outwards from the radially inner through hole while extending around the radially outer through hole.

6. The stator for an electric rotary machine according to claim 3, wherein the radially outer coil bar and the radially inner coil bar have the same length.

7. The stator for an electric rotary machine according to claim 1, wherein the pluralities of connection coils are disposed within a region where the stator core is projected in the axial direction.

* * * * *